United States Patent

Herrmann (10) Patent No.: US 9,925,827 B2
(45) Date of Patent: Mar. 27, 2018

(54) AIRCRAFT WHEEL RELEASE CHANNEL

(71) Applicant: Goodrich Corporation, Charlotte, NC (US)

(72) Inventor: Nathaniel John Herrmann, Springfield, OH (US)

(73) Assignee: Goodrich Corporation, Charlotte, NC (US)

( * ) Notice: Subject to any disclaimer, the term of this patent is extended or adjusted under 35 U.S.C. 154(b) by 145 days.

(21) Appl. No.: 14/671,600

(22) Filed: Mar. 27, 2015

(65) Prior Publication Data

US 2016/0280004 A1  Sep. 29, 2016

(51) Int. Cl.
| | |
|---|---|
| *B60B 3/08* | (2006.01) |
| *B60B 23/10* | (2006.01) |
| *B60B 3/00* | (2006.01) |
| *B60B 5/02* | (2006.01) |
| *B64C 25/36* | (2006.01) |
| *B64C 25/34* | (2006.01) |

(52) U.S. Cl.
CPC ............... *B60B 3/08* (2013.01); *B60B 3/002* (2013.01); *B60B 23/10* (2013.01); *B60B 5/02* (2013.01); *B64C 25/34* (2013.01); *B64C 25/36* (2013.01)

(58) Field of Classification Search
CPC .......... B60B 3/005; B60B 3/04; B60B 3/041; B60B 3/044; B60B 23/10; B60B 3/08; B60B 3/002; B60B 5/02
USPC ................... 301/6.2, 64.304, 64.306, 64.706
See application file for complete search history.

(56) References Cited

U.S. PATENT DOCUMENTS

| | | | | |
|---|---|---|---|---|
| 2,884,042 A | | 4/1959 | Seaton | |
| 3,882,919 A | * | 5/1975 | Sons, Jr. ................. | B60B 25/04 152/405 |
| 4,151,870 A | * | 5/1979 | Watts ................... | B60C 15/0226 152/375 |
| 4,241,776 A | * | 12/1980 | Stewart ................... | B60B 21/10 152/381.4 |
| 4,572,265 A | * | 2/1986 | Lescoffit ................. | B60B 21/02 152/379.3 |
| 4,997,235 A | * | 3/1991 | Braungart ................. | B60B 3/06 152/396 |
| 5,000,241 A | * | 3/1991 | Patecell .................. | B60B 21/12 152/381.5 |

(Continued)

FOREIGN PATENT DOCUMENTS

EP   2923858   9/2015

OTHER PUBLICATIONS

Extended European Search Report dated Jul. 29, 2016 in European Application No. 16162220.4.

*Primary Examiner* — Jason R Bellinger
*Assistant Examiner* — Scott A Browne
(74) *Attorney, Agent, or Firm* — Snell & Wilmer L.L.P.

(57) ABSTRACT

The present disclosure provides devices related to aircraft wheel assemblies and aircraft wheel air pressure release channels. In various embodiments, an inboard aircraft wheel half may comprise an inboard flange portion disposed on an inboard end of the inboard wheel half, a bolted flange portion disposed on an outboard end of the inboard wheel half, and a tubewell portion disposed between the inboard flange portion and the bolted flange portion. In various embodiments, the bolted flange portion may comprise an o-ring seat, an inboard bolt hole, a register, and a release channel disposed in the register.

15 Claims, 6 Drawing Sheets

(56) References Cited

U.S. PATENT DOCUMENTS

| | | | |
|---|---|---|---|
| 5,343,920 A * | 9/1994 | Cady | B60B 25/22 |
| | | | 152/396 |
| 7,284,584 B2 * | 10/2007 | Kimura | B60B 1/06 |
| | | | 152/396 |
| 7,451,794 B1 * | 11/2008 | Baird | B60B 3/08 |
| | | | 152/405 |
| 9,346,318 B2 * | 5/2016 | Phillis | B60B 15/00 |
| 9,630,448 B2 * | 4/2017 | Delayre | B60B 21/04 |

* cited by examiner

AIRCRAFT WHEEL RELEASE CHANNEL

FIELD OF THE DISCLOSURE

The present disclosure relates to aircraft wheel assemblies and, more particularly, to aircraft wheel air pressure release channels.

BACKGROUND OF THE DISCLOSURE

Aircraft wheel assemblies often comprise of dual-web or single-web wheel designs whereby two wheel halves are joined together by a series of tie bolts. In single-web bolted wheels, only one wheel half registers on the aircraft axle where load is reacted. Therefore, all load on one wheel half must travel through the bolted joint to reach the other wheel half that registers to the axle, making the bolted joint sensitive to improper preload. Tie bolt loosening in service can occur when tie bolts are improperly preloaded due to poor maintenance or assembly practices. If multiple tie bolts loosen, stresses on the tubewell increase quickly and can exceed the ultimate strength of the material, resulting in a rapid release of tire pressure.

SUMMARY OF THE DISCLOSURE

In various embodiments, the present disclosure provides an inboard wheel half comprising a tubewell portion disposed between an inboard flange portion and a bolted flange portion, the bolted flange portion further comprising an o-ring seat, a plurality of inboard bolt holes, a register, and at least one release channel disposed in the register. In various embodiments, the release channel may comprise a sharp edge and/or a sharp vertex.

In various embodiments, the present disclosure provides an outboard wheel half comprising a plurality of outboard bolt holes, an inboard wheel half coupled to the outboard wheel half by a plurality of tie bolts and comprising a tubewell portion, disposed between an inboard flange portion and a bolted flange portion, the bolted flange portion comprising an o-ring seat, a plurality of inboard bolt holes, a register, and at least one release channel disposed in the register, and an o-ring, disposed on the o-ring seat and between the inboard wheel half and the outboard wheel half. In various embodiments, the release channel may be configured to cut and/or abrade the o-ring. In various embodiments, the release channel may be configured to allow pressurized air to flow in an outboard direction under an o-ring disposed in the o-ring seat.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

In the context of the present disclosure, devices may find particular use in connection with aircraft wheel assemblies. However, various aspects of the disclosed embodiments may be adapted for optimized performance with a variety of wheel assemblies, including automobile wheel assemblies and various other motor vehicle wheel assemblies. As such, numerous applications of the present disclosure may be realized.

Figure 1:
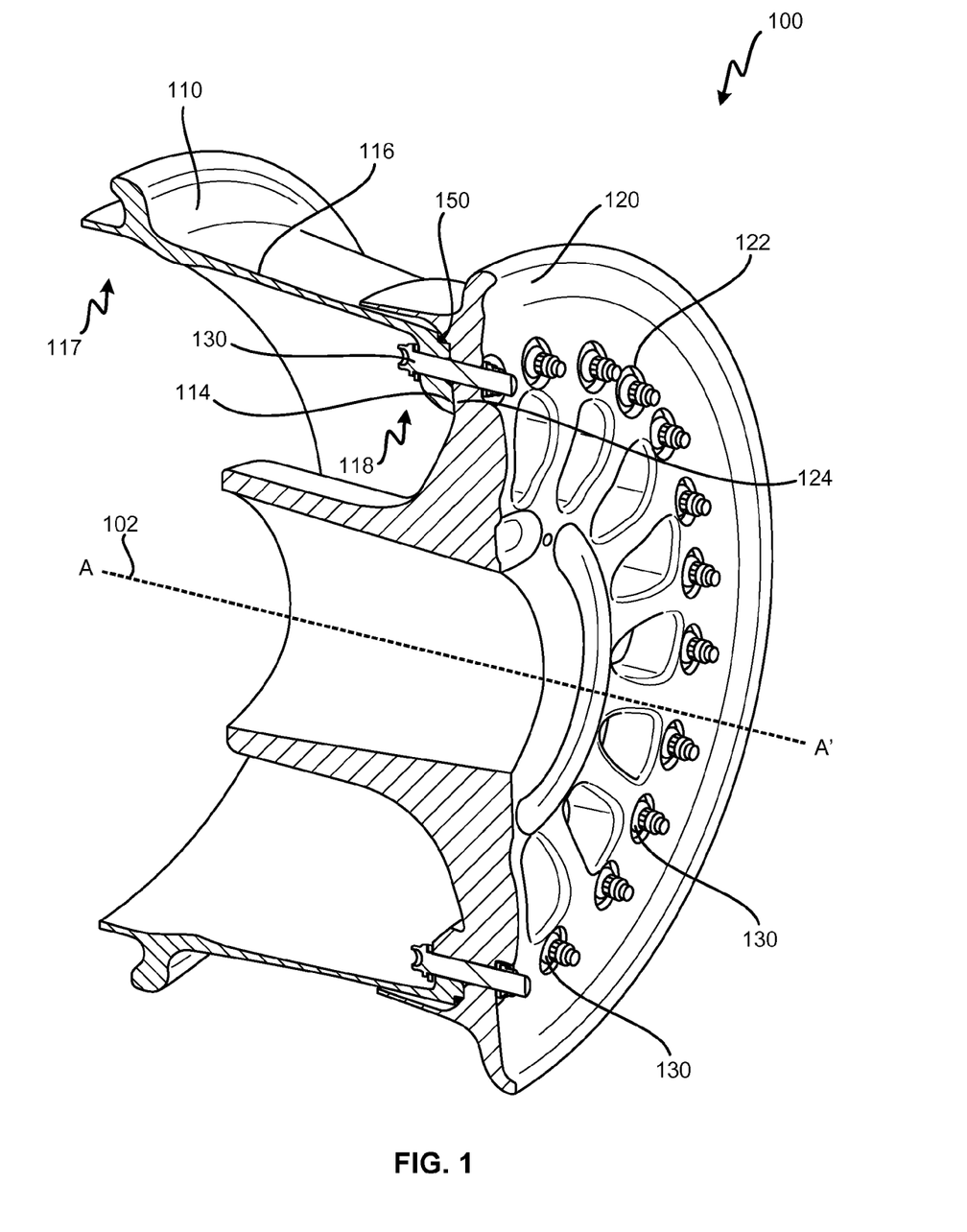
FIG. 1 illustrates a perspective view of portions of an aircraft wheel assembly in accordance with various embodiments.

As used herein and with reference to FIG. 1, the terms "inboard" and "outboard" are used to describe relative positions and/or directions of travel in relation to an axis of rotation 102 marked A-A', with A being inboard of A' and A' being outboard of A. For example, an inboard component should be understood to be closer to A than an outboard component of the same type (e.g., an inboard wheel half should be understood to be closer to A than an outboard wheel half). For example, movement in an inboard direction should be understood to be in a direction towards A, and movement in an outboard direction should be understood to be in a direction towards A'.

Figure 2A:
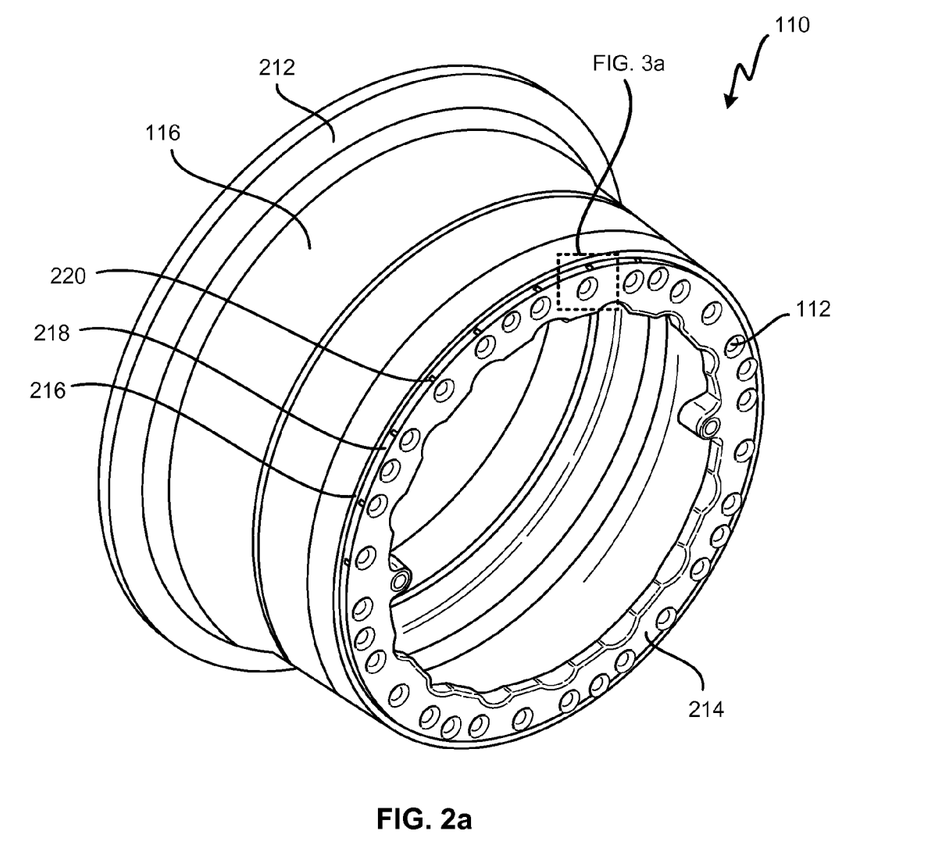
FIG. 2a illustrates a perspective view of an inboard wheel half in accordance with various embodiments.
Figure 2B:
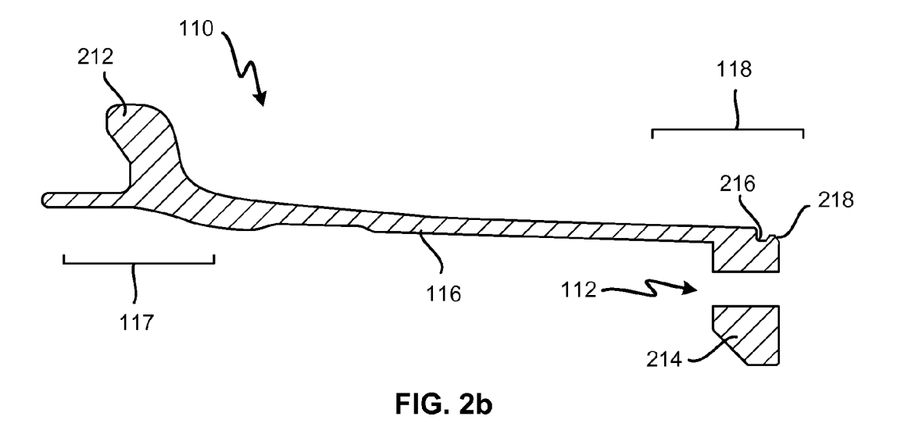
FIG. 2b illustrates a cross section of an inboard wheel half in accordance with various embodiments.

With reference to FIGS. 1, 2a, and 2b, in various embodiments, an aircraft wheel assembly 100 may comprise an inboard wheel half 110 and an outboard wheel half 120 oriented about axis of rotation 102. In various embodiments, inboard wheel half 110 may comprise a plurality of inboard bolt holes 112, and outboard wheel half 120 may comprise a plurality of outboard bolt holes 122. In various embodiments, inboard wheel half 110 and outboard wheel half 120 may be oriented such that inboard bolt holes 112 and outboard bolt holes 122 are radially aligned. In various embodiments, inboard wheel half 110 and outboard wheel half 120 may be coupled by a plurality of tie bolts 130, each tie bolt 130 being disposed in an inboard bolt hole 112 and an outboard bolt hole 122.

In various embodiments, inboard wheel half 110 may comprise an inboard mating face 114, and outboard wheel half 120 may comprise an outboard mating face 124. In various embodiments, inboard mating face 114 may be disposed radially about inboard bolt hole 112, and outboard mating face 124 may be disposed radially about outboard bolt hole 122. When tie bolts 130 are properly maintained and properly tightened, inboard mating face 114 and outboard mating face 124 may be in contact with each other in substantially parallel planes.

In various embodiments, a tire may be disposed around an outer circumference of aircraft wheel assembly 100. Inflation of the tire creates high air pressure forces acting in a radially inward direction on the outer circumference of aircraft wheel assembly 100, acting in an inboard direction on inboard flange portion 212 (with momentary reference to FIGS. 2*a* and 2*b*), and acting in an outboard direction on a wheel flange of outboard wheel half 120. In various embodiments, inboard wheel half 110 may further comprise a tubewell portion 116. In various embodiments, tubewell portion 116 may comprise a thin web extending at least partially between an inboard end 117 and an outboard end 118, and is subjected to high air pressure forces upon tire inflation. In various embodiments, aircraft wheel assembly 100 may further comprise an o-ring 150 disposed between inboard wheel half 110 and outboard wheel half 120. O-ring 150 may comprise an annular, elastomeric gasket configured to create an air-tight seal between inboard wheel half 110 and outboard wheel half 120.

FIG. 1 provides a general understanding of the structure of various aircraft wheel assemblies, and is not intended to limit the disclosure. The present disclosure may extend to all types of applications and to all types of aircraft wheel assemblies, including dual-web bolted wheel assemblies and the like.

With reference to FIGS. 2*a* and 2*b*, in various embodiments, an inboard wheel half 110 may comprise an inboard flange portion 212, a bolted flange portion 214, and a tubewell portion 116 disposed therebetween. In various embodiments, inboard flange portion 212 may be disposed on the inboard end 117 of inboard wheel half 110, and bolted flange portion 214 may be disposed on the outboard end 118 of inboard wheel half 110. In various embodiments, inboard wheel half 110 may comprise a plurality of inboard bolt holes 112 disposed in bolted flange portion 214 and extending from an inboard face of bolted flange portion 214 to an outboard face of bolted flange portion 214.

In various embodiments, inboard wheel half 110 may comprise an o-ring seat 216. O-ring seat 216 may comprise a circumferential groove, channel, or filleted edge disposed in an outer diameter of bolted flange portion 214. In various embodiments, o-ring seat 216 may be configured to seat o-ring 150.

In various embodiments, inboard wheel half 110 may comprise a register 218. In various embodiments, register 218 may comprise a circumferential process, buttress, or ridge disposed on an outer diameter of bolted flange portion 214 and outboard from o-ring seat 216. In various embodiments and with reference to FIGS. 3*a*, 3*b*, and 3*c*, register 218 may comprise an inboard face 302, an outboard face 306, and a top face 304 disposed therebetween. In various embodiments, inboard face 302 and top face 304 of register 218 may be disposed perpendicularly to one another. In various embodiments, at least one of inboard face 302, outboard face 306, and top face 304 may comprise an elliptical face. In various embodiments, register 218 may be configured such that inboard face 302 extends in a radially outward direction as it extends in an outboard direction. Stated differently, inboard face 302 of register 218 may extend diagonally in a radially outward and outboard direction from o-ring seat 216. However, register 218 may be configured in any suitable shape.

In various embodiments and with reference to FIGS. 2*a*, 3*a*, 3*b*, and 3*c*, inboard wheel half 110 may comprise a release channel 220. Release channel 220 may comprise a slot, groove, channel, depression, or the like disposed in register 218 and extending from inboard face 302 of register 218 to outboard face 306 of register 218. In various embodiments, release channel 220 may be radially aligned with, and disposed radially outward of, inboard bolt hole 112. In various embodiments, inboard wheel half 110 may comprise a plurality of release channels 220. In various embodiments, at least one release channel 220 may be radially aligned with, and disposed radially outward of, each inboard bolt hole 112 disposed in inboard wheel half 110.

Figure 3A:
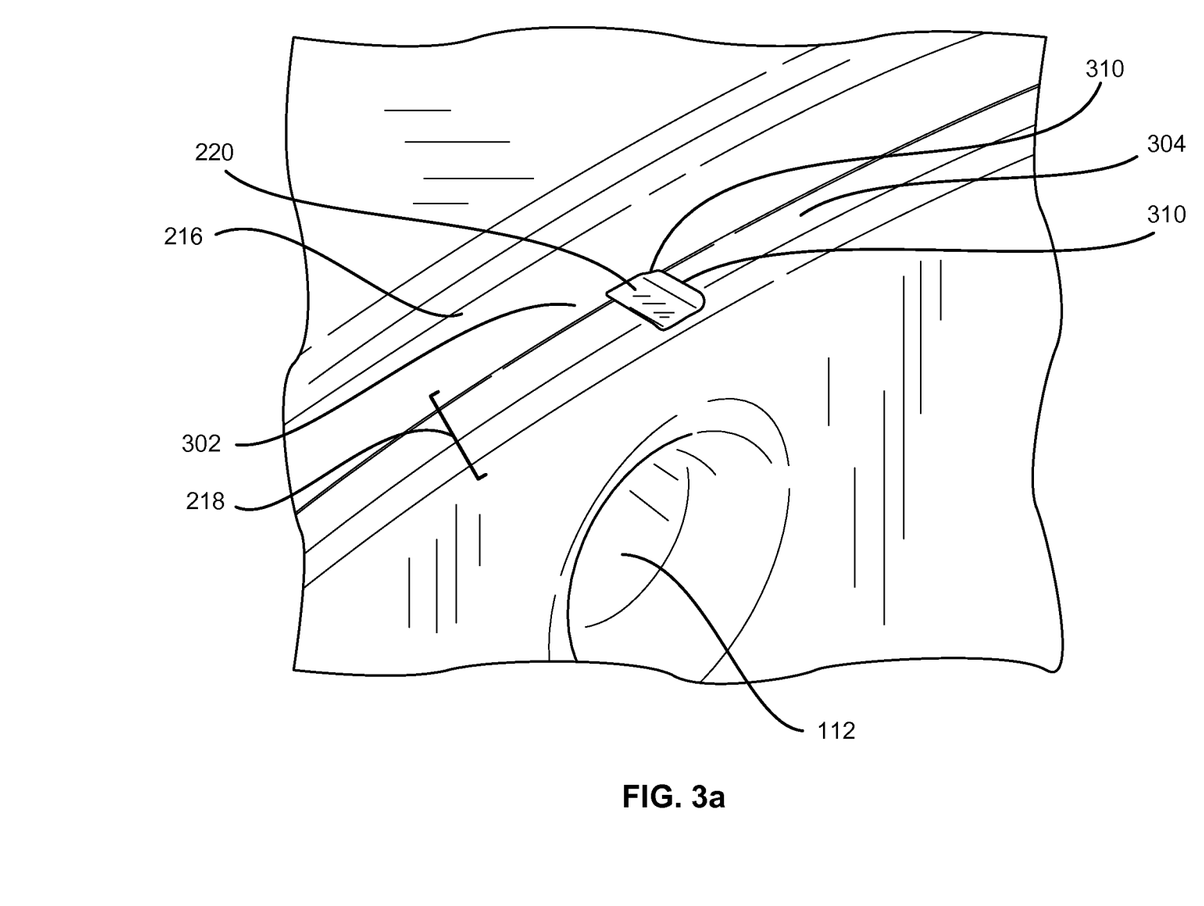
FIG. 3a illustrates an expanded view of FIG. 2a in accordance with various embodiments.
Figure 3B:
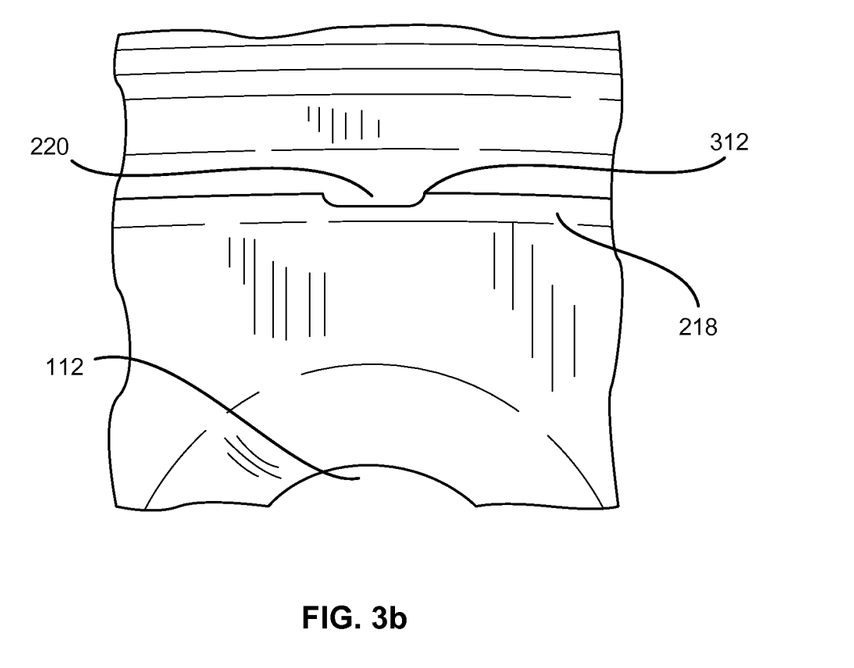
FIG. 3b illustrates a front view of a release channel in accordance with various embodiments.
Figure 3C:
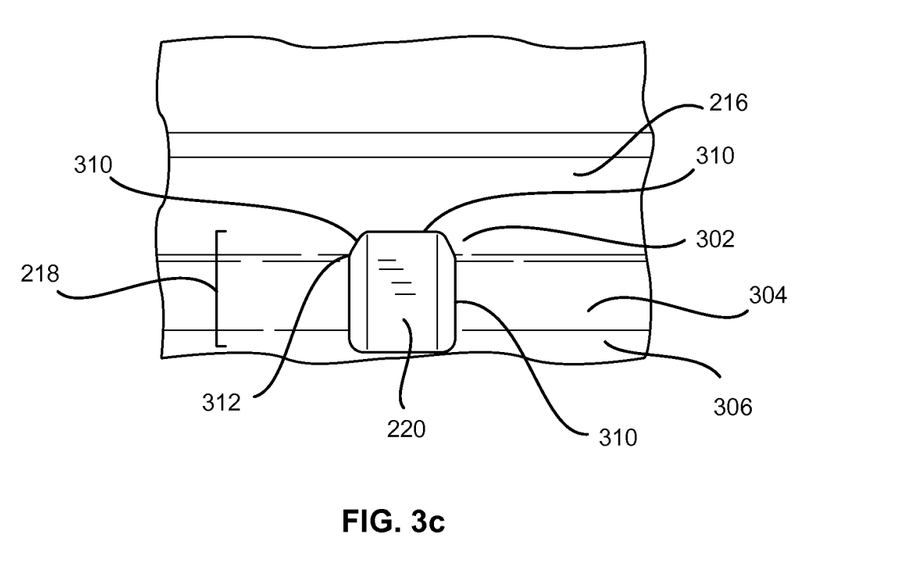
FIG. 3c illustrates a top view of a release channel in accordance with various embodiments.

In various embodiments and with reference to FIGS. 3*a*, 3*b*, and 3*c*, release channel 220 may comprise a sharp edge 310 and/or sharp vertex 312. In various embodiments, sharp edge 310 and/or sharp vertex 312 may be disposed on the perimeter of release channel 220. In various embodiments, release channel 220 may comprise plurality of sharp edges 310 and/or sharp vertices 312. In various embodiments, sharp edge 310 may be disposed at the junction of inboard face 302 of register 218 and release channel 220. In various embodiments, sharp edge 310 may be disposed at the junction of top face 304 of register 218 and release channel 220. In various embodiments, sharp vertex 312 may be disposed at the junction of top face 304 of register 218, inboard face 302 of register 218, and release channel 220.

In various embodiments, sharp edge 310 may comprise an angle of between thirty degrees and one hundred fifty degrees. In various embodiments, sharp edge 310 may comprise an angle of ninety degrees, or any angle of suitable sharpness. In various embodiments, sharp edge 310 and/or sharp vertex 312 may be suitably sharp so as to cut and/or abrade o-ring 150 in response to contact with sharp edge 310 and/or sharp vertex 312. In various embodiments, sharp edge 310 and/or sharp vertex 312 may be suitably sharp so as to concentrate pressure on a small surface area of o-ring 150 sufficient to cut and/or abrade o-ring 150. In various embodiments, release channel 220, sharp edge 310, and/or sharp vertex 312 may comprise a bladed edge, abrasive surface, and/or he like. In various embodiments, release channel 220, sharp edge 310, and/or sharp vertex 312 may be coated with an abrasive material.

In various embodiments, release channels may be formed by any conventional manufacturing means, including subtractive manufacturing methods and additive manufacturing methods. In various embodiments, release channels may be milled in a newly manufactured inboard wheel half. In various embodiments, a previously manufactured and/or used inboard wheel half may be retrofit with at least one release channel by any suitable metalworking technique such as machining, milling, grinding, or the like.

Figure 4A:
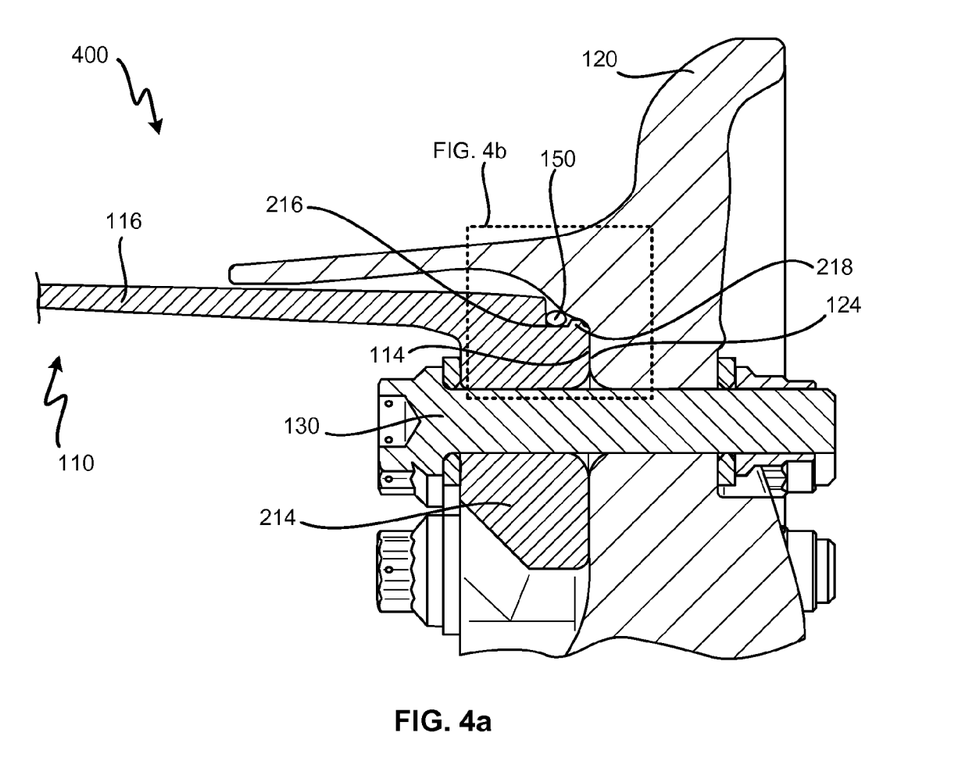
FIG. 4a illustrates a cross section of portions of an aircraft wheel assembly in accordance with various embodiments.
Figure 4B:
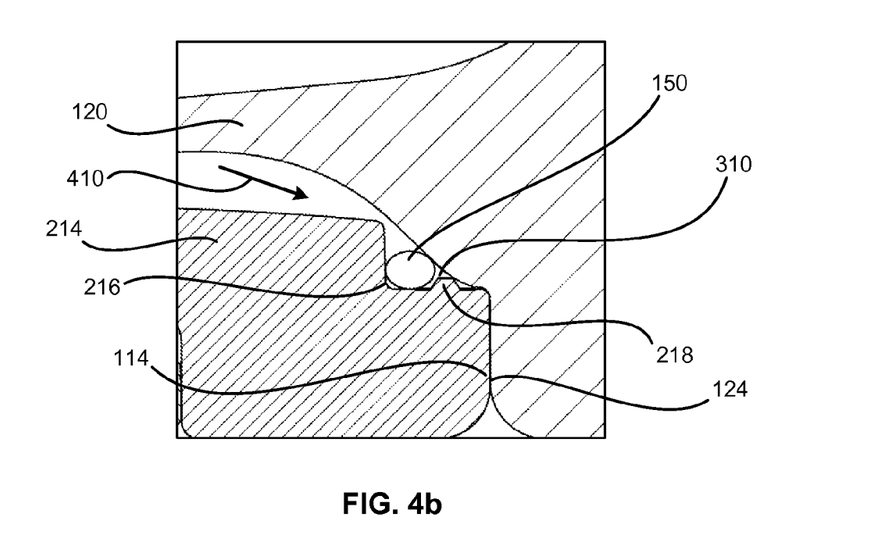
FIG. 4b illustrates an expanded view of FIG. 4a in accordance with various embodiments.

With reference to FIGS. 4*a* and 4*b*, in various embodiments, an aircraft wheel assembly 400 may comprise an inboard wheel half 110, and outboard wheel half 120, and an o-ring 150. In various embodiments, inboard wheel half 110 may comprise an inboard flange portion 212 disposed on an inboard end 117 (with momentary reference to FIG. 2*b*) of the inboard wheel half 110, a bolted flange portion 214 disposed on an outboard end 118 (with momentary reference to FIG. 2b) of the inboard wheel half 110, and a tubewell portion 116 disposed between the inboard flange portion 212 and the bolted flange portion 214 (with momentary reference to FIG. 2b). In various embodiments, bolted flange portion 214 may comprise an o-ring seat 216, a plurality of inboard bolt holes 112, a register 218, and at least one release channel disposed in register 218.

In various embodiments, o-ring 150 is configured to create an air-tight seal between inboard wheel half 110 and outboard wheel half 120. Upon tire inflation, high air pressure force 410 acts on o-ring 150 in an outboard direction, as represented in FIG. 4b. In various embodiments, when tie bolts 130 are properly maintained and properly assembled, inboard mating face 114 and outboard mating face 124 may be in contact with each other in substantially parallel planes. In various embodiments, when mating faces 114, 124 are properly aligned, o-ring 150 may be in physical contact with o-ring seat 216 and outboard wheel half 120, but may not be in physical contact with register 218.

Figure 4C:
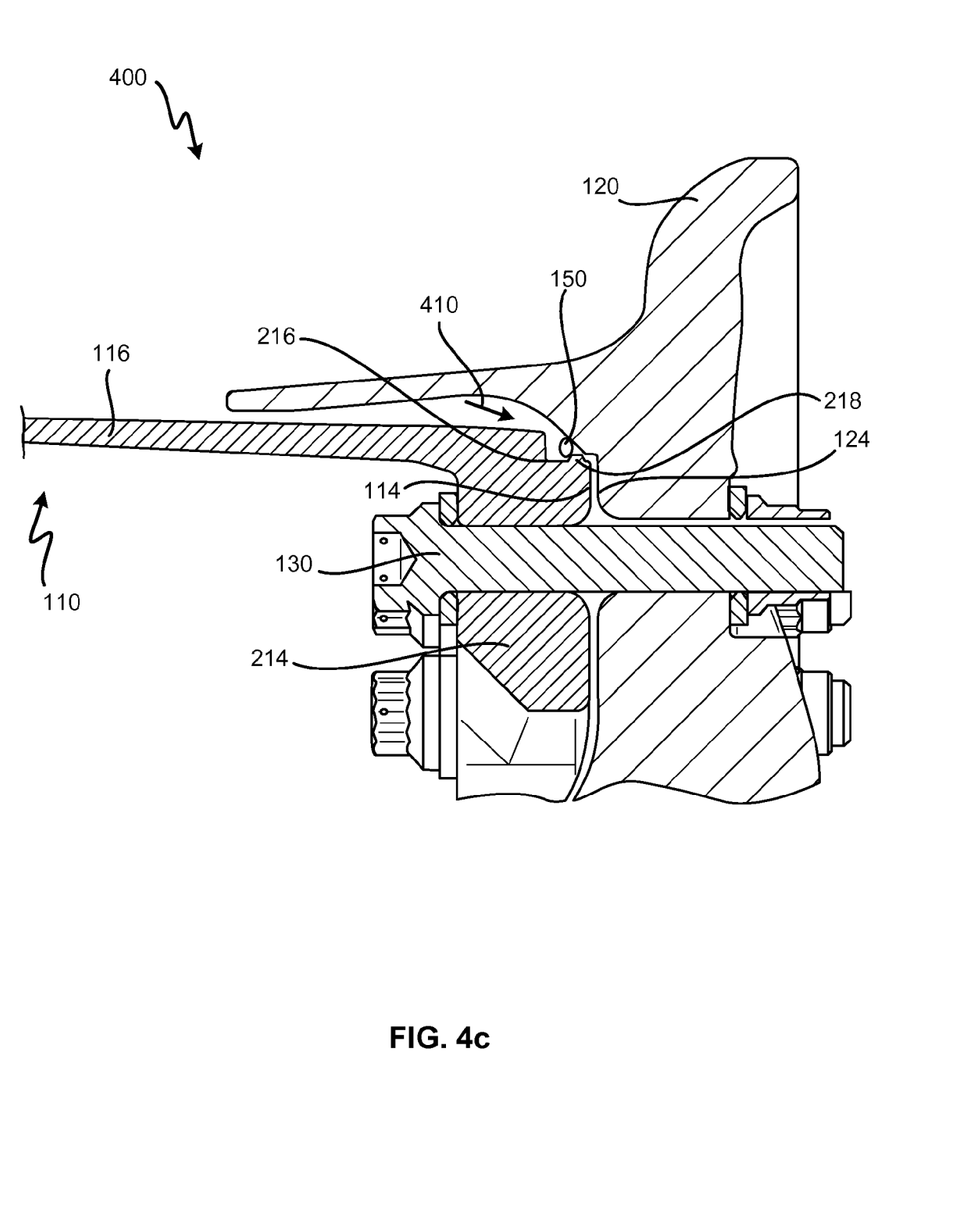
FIG. 4c illustrates a cross section of portions of an aircraft wheel assembly in accordance with various embodiments.

In various embodiments and with reference to FIG. 4c, improper maintenance and/or improper assembly of aircraft wheel assembly 400 may cause loosening of tie bolt 130. In various embodiments, loosening of tie bolt 130 may cause loosening of a plurality of tie bolts. In various embodiments, loosening of a plurality of tie bolts may cause mating faces 114, 124 to separate. In various embodiments, air pressure force 410 acting on o-ring 150 may cause migration of o-ring 150 in an outboard direction. In various embodiments, air pressure force 410 acting on o-ring 150 may cause deformation of o-ring 150 in an outboard direction. Such migration and/or deformation may cause o-ring to come into physical contact with register 218, sharp edge 310, and/or sharp vertex 312. In various embodiments, migration, vibration, and/or physical contact with sharp edge 310 and/or sharp vertex may cut o-ring 150, breaking the seal created by o-ring 150, and allowing air to flow gradually from inboard to outboard and external to aircraft wheel assembly 400.

In various embodiments, migration, vibration, and/or physical contact with sharp edge 310 and/or sharp vertex 312 may abrade o-ring 150. In various embodiments, abrasion of o-ring 150 may cause it to break, breaking the seal created by o-ring 150, and allowing air to flow gradually from inboard to outboard and externally of aircraft wheel assembly 400. In various embodiments, abrasion of o-ring 150 may cause the diameter of o-ring 150 to increase, allowing and/or encouraging further migration in an outboard direction. In various embodiments, migration of o-ring 150 may be diagonally in an outboard and radially outward direction. In various embodiments, such migration may expose at least one release channel, allowing air to flow gradually under o-ring 150 from inboard to outboard and externally of aircraft wheel assembly 400. Gradual release of tire air pressure may present a cost effective and/or safe failure mode in the event that improper maintenance and/or improper assembly causes loosening of tie bolts in an aircraft wheel assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inboard aircraft wheel half, comprising:
   an inboard flange portion, disposed on an inboard end of the inboard wheel half;
   a bolted flange portion, disposed on an outboard end of the inboard wheel half, the bolted flange portion comprising an o-ring seat, an inboard bolt hole, a register, and a release channel disposed in the register,
   wherein the register and the entire release channel are disposed axially outboard from the o-ring seat, axially inboard of a mating face, and between the o-ring seat and the mating face; and
   a tubewell portion, disposed between the inboard flange portion and the bolted flange portion,
   wherein the release channel comprises a sharp edge configured to at least one of abrade or cut an o-ring in response to physical contact between the sharp edge and the o-ring.

2. The inboard wheel half of claim 1, wherein the sharp edge comprises a ninety-degree angle.

3. The inboard wheel half of claim 1, wherein the release channel comprises a sharp vertex.

4. The inboard wheel half of claim 1, wherein the release channel is radially aligned with, and disposed radially outward of, the inboard bolt hole.

5. The inboard wheel half of claim 4, wherein the inboard bolt hole is disposed in the bolted flange portion.

6. The inboard wheel half of claim 1, wherein the register comprises a circumferential ridge disposed on an outer diameter of the bolted flange portion.

7. The inboard wheel half of claim 1, wherein the release channel comprises a groove extending in an axial direction.

8. An aircraft wheel assembly, comprising:
an outboard wheel half, comprising a plurality of outboard bolt holes and an outboard mating face;
an inboard wheel half, coupled to the outboard wheel half by a plurality of tie bolts, and comprising:
an inboard flange portion, disposed on an inboard end of the inboard wheel half;
a bolted flange portion, disposed on an outboard end of the inboard wheel half, the bolted flange portion further comprising an inboard mating face, an o-ring seat, a plurality of inboard bolt holes, a register, and a release channel disposed in the register,
wherein the register and the entire release channel are disposed axially outboard from the o-ring seat, axially inboard of the inboard mating face, and between the o-ring seat and the inboard mating face; and
a tubewell portion, disposed between the inboard flange portion and the bolted flange portion; and
an o-ring, disposed on the o-ring seat and between the inboard wheel half and the outboard wheel half,
wherein an edge defining the release channel is configured to at least one of abrade and cut the o-ring in response to physical contact between the edge and the o-ring.

9. The aircraft wheel assembly of claim 8, wherein the o-ring is configured to create a seal between the inboard wheel half and the outboard wheel half.

10. The aircraft wheel assembly of claim 9, wherein, in response to migration of the o-ring in an outboard direction, air flows through the release channel in the outboard direction.

11. The aircraft wheel assembly of claim 9, wherein the release channel comprises a sharp edge.

12. The aircraft wheel assembly of claim 11, wherein the sharp edge comprises a ninety-degree angle.

13. The aircraft wheel assembly of claim 9, wherein the release channel comprises a sharp vertex.

14. The aircraft wheel assembly of claim 11, wherein the release channel is radially aligned with, and disposed outward of, one of the plurality of inboard bolt holes.

15. The aircraft wheel assembly of claim 8, wherein the outboard mating face is in contact with the inboard mating face.

* * * * *